United States Patent

Frye

[11] 4,113,228
[45] Sep. 12, 1978

[54] ROTARY PLUG VALVE

[76] Inventor: James A. Frye, 1720 Drakestone, Oklahoma City, Okla. 73120

[21] Appl. No.: 735,699

[22] Filed: Oct. 26, 1976

Related U.S. Application Data

[63] Continuation-in-part of Ser. No. 654,081, Feb. 2, 1976, abandoned.

[51] Int. Cl.$^2$ .......................... F16K 5/00; F16K 5/18; F16K 25/00
[52] U.S. Cl. ..................... 251/159; 251/317; 251/192; 251/172; 251/283; 251/161; 251/309; 251/174
[58] Field of Search ............................ 251/309–312, 251/314, 316–317, 172, 175, 192, 283, 159, 174

[56] References Cited

U.S. PATENT DOCUMENTS

| | | | |
|---|---|---|---|
| 2,813,695 | 11/1957 | Stogner | 251/317 |
| 3,061,267 | 10/1962 | Hamer | 251/317 |
| 3,066,909 | 12/1962 | Reed, Jr. | 251/283 |
| 3,133,722 | 5/1964 | McGuire | 251/309 |
| 3,178,152 | 4/1965 | Bishop | 251/310 |
| 3,194,534 | 7/1965 | Sachnik | 251/283 |
| 3,423,067 | 1/1969 | Foster | 251/309 |
| 3,425,661 | 2/1969 | Mayo | 251/283 |
| 3,430,919 | 3/1969 | Frazier | 251/283 |

Primary Examiner—William R. Cline
Assistant Examiner—H. Jay Spiegel
Attorney, Agent, or Firm—William R. Laney

[57] ABSTRACT

A rotary plug valve comprised of a valve body having a replaceable liner and valve plug disposed therein. The liner is formed of a pair of axially split complementary liner members, including an upstream liner member and a downstream liner member, having at least one radially elastically deformable retaining member disposed around the periphery thereof. The dimensions of the valve plug, the liner members forming the liner and the elastically deformable retaining member are such that at pressures in the lower part of the working range of the valve, the retaining member is held in an elastically deformed condition, and the valve plug and liner are maintained in forceful intimate contact independent of pressure-related deformations in the valve body, and such that at relatively higher pressures above some predetermined intermediate pressure, the retaining member is further elastically radially expanded by the forces from the development of line pressure between the upstream liner member and the valve plug, and the seal between the upstream liner member and the valve plug is broken due to the high pressure fluid being forced therebetween, so that the force tending to move the upstream liner member against the valve plug is reduced, and less torque is required to open the valve.

8 Claims, 4 Drawing Figures

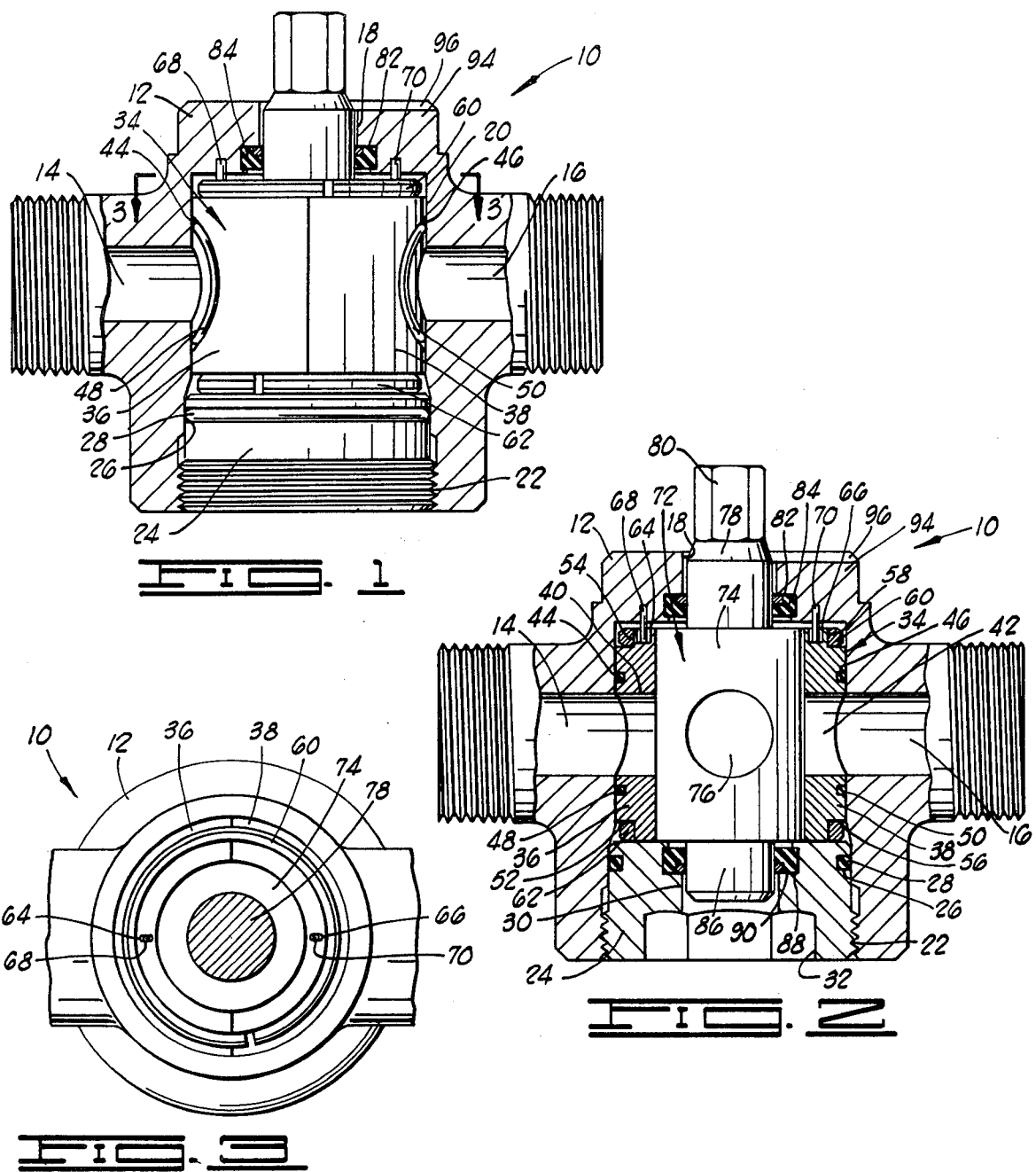
FIG. 1
FIG. 2
FIG. 3
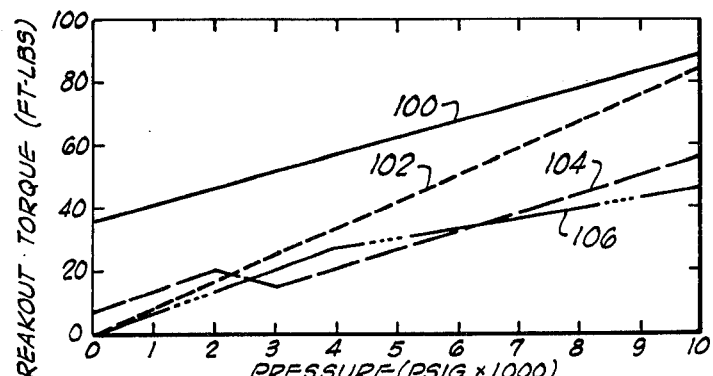
FIG. 4

ROTARY PLUG VALVE

CROSS-REFERENCE TO RELATED APPLICATION

This application is a continuation-in-part of Applicant's prior United States Patent Application Ser. No. 654,081, filed Feb. 2, 1976, now abandoned.

BACKGROUND OF THE INVENTION

1. Field of the Invention

This invention relates generally to rotary plug valves, and more particularly, but not by way of limitation, to rotary plug valves including replaceable valve body liners.

2. Description of the Prior Art

A variety of rotary plug valves have been developed and used heretofore, which valves include replaceable valve body liners interposed between the valve body and the valve plug. The liner protects the valve body against wear and erosion and provides a replaceable bearing surface adjacent the valve plug.

In some types of prior plug valves having a tapered plug, the relatively thin-walled valve bodies undergo expansion when the valve is closed and high line pressure is applied. The expansion of the valve body around the tapered plug permits high-pressure fluid to pass between the body and the valve plug. A force is then developed which acts across the tapered plug, tending to drive it down into the tapered interior of the valve body, and thus wedging the plug in the valve body. This wedging action which occurs as a result of the force differential acting across the tapered plug causes the opening torque to be excessive, and opening of the valve is rendered extremely difficult.

One solution for the undesirable "freezing" effect which thus occurs and prevents easy opening of the valve in high pressure service has been to increase the thickness of the valve body in which the tapered plug is located to thereby reduce the degree of expansion, and thus the extent of leakage of high line pressure fluid around the tapered core. It has also been proposed to inject a pressurized fluid into the valve body at a location where it will act against the small surface area at the small end of the tapered plug, and thus tend to restore a balance of pressure forces and oppose forcing of the tapered plug into the tapered cavity of the valve body.

More recently, it has been proposed in at least one commercially available valve, occasionally referred to as a "lo-torq" valve, to use a cylindrical valve plug or core which is surrounded at its outer cylindrical surface by two tapered liner inserts which are, considered together, in the form of a frusto-conical insert having a cylindrical bore through the center thereof, and split into two halves along a plane passed through the central axis of such frusto-conical insert. The cylindrical inside diameter of the two insert halves corresponds to the cylindrical outside diameter of the cylindrical plug. Again, however, in this type of valve, pressure enlargement of the body cavity within the valve body, accompanied by floating downstream of the composite plug and liner (insert) parts, permits the valve cavity to become filled with high-pressure fluid leaking past the upstream seal, and again causing wedging of the two liner or insert parts downwardly in the valve body, and against the outer peripheral surface of the plug. As the tapered inserts are driven further into the body cavity, they act as wedges and tighten and clamp upon the plug, making it very difficult to open the valve without damaging the parts.

To offset this differential force wedging effect, it is sometimes proposed to balance the pressure system, as previously described, by the injection of a pressurized fluid into the lower side of the body cavity, and against the relatively small lower end face of the two frusto-conically shaped inserts. Some efforts have also been recently made to reduce the propensity of the plug and insert combination to float downstream under high pressure in valves of this type by providing grooves or recesses in the bonnet of the valve into which the two split insert halves are keyed or fitted. This arrangement undertakes to prevent, by such physical engagement, the plug and inserts drifting downstream when the valve body enlarges and the plug and inserts are otherwise free to float. While this has effected some reduction in the floating action described, and the following wedging action by which the inserts are driven into clamping engagement with the plug, the latter difficulty has not been entirely alleviated by this expedient. Valves of the sort described above are shown in McGuire et al. U.S. Pat. No. 3,133,722 and Stogner U.S. Pat. No. 2,813,695.

A more recent effort to obtain the best compromise between optimum sealing of the plug valve and low opening torque at high pressure is reflected in the plug valve shown in Thompson et al. U.S. Pat. No. 3,346,002. The Thompson et al. valve has several advantages over the tapered plug type valves, or the tapered, generally frusto-conical split insert type valves hereinbefore described. In the Thompson et al. valve, both the plug, and an insert used in conjunction with the plug to provide a seat for the plug and concomitantly seal with the valve body, are cylindrical in configuration. This makes the valve considerably more economical to fabricate as the cylindrical surfaces are much less expensive to generate during construction than tapered plugs or inserts. Moreover, the Thompson et al. valve undertakes to afford at least a partial solution to the force differential problem previously described, and indicated in the foregoing discussion to result from the difference in cross-sectional areas characteristic of plugs or inserts which are tapered to a reduced diameter at their lower end.

In the Thompson et al. valve, the cylindrical plug which is provided is seated within a split cylindrical liner or sleeve which is sealingly positioned within the valve body cavity. The sleeve or liner is split at one side thereof so that it can expand or contract, and is machined to closely and sealingly engage the cylindrical external periphery of the valve plug which is positioned within the split liner. Despite the split along one side of the cylindrical liner, it functions under high pressure as an essentially unitary rigid member. The high-pressure fluid acting on the upstream side of the line, within the annular area circumscribed by the O-ring between the liner and the inside of the valve body cavity, forces that area of the liner against the valve plug, thereby clamping the valve plug, and causing a relatively high amount of torque to be required to open the valve when such high-pressure conditions exist. Due to its unitary rigid design, the liner member cannot separate from the valve plug to relieve this clamping, vise-like contact with the valve plug. High-pressure fluid cannot force its way between the liner member and the valve plug.

Another valve similar in concept to that of Thompson et al. is that shown in Foster U.S. Pat. No. 3,423,067.

Another effort to achieve a low opening torque valve by the use of a cylindrical liner and plug in a cylindrical bore is that shown in Hammer U.S. Pat. No. 3,061,267. In the Hammer valve, the cylindrical plug is seated within a four-piece cylindrical liner which is sealingly positioned within the valve body cavity. Between the outer diameter of the liner and the inner diameter of the valve body cavity are positioned resilient members which, when axially compressed by means of a keeper ring which screws into the top of the valve body, expand radially inwardly and outwardly to urge the liner members into intimate contact with the valve plug. Hamer recognized that a lower opening torque can be achieved at high pressures by not having a fluid seal on the upstream side of the valve plug and relying on only the downstream seal, but in order to achieve this, Hamer found it necessary to use a sealing means between the liner and the valve body cavity which was a one-way sealing means which could seal only on the downstream side of the valve and never on the upstream side of the valve. Hamer's valve, therefore, always has only a downstream seal, even at very low pressures. The problems with high opening torque apply only at relatively high pressures. There are advantages to having an upstream seal at lower pressures and at such lower pressures, opening torque is not a problem. Hamer found it necessary, nevertheless, to sacrifice the benefits of having both an upstream seal and a downstream seal at lower pressures in order to achieve the benefit of having only a downstream seal at the higher pressures.

The valve of Bishop U.S. Pat. No. 3,178,152 uses elastic retaining rings, but that valve is completely non-analogous to the valves discussed above, and to the valve of this invention. Bishop's valve is for very low pressure service only. It uses retaining rings to hold a casing in contact with a plug. It has no liner between the casing and the plug.

SUMMARY OF THE INVENTION

Broadly described, the valve of the present invention includes a valve body having inlet and outlet fluid passageways and a bore positioned transversely or extending normal to the passageways. A pair of split complementary liner members, including an upstream liner member and a downstream liner member together forming a liner, are positioned within the bore, and the liner is provided with inlet and outlet fluid passageways communicated with the inlet and outlet fluid passageways in the valve body. At least one radially elastically deformable retaining member is disposed around the periphery of the liner and a valve plug is rotatably positioned within the liner.

The dimensions of the valve plug, the liner members forming the liner and the radially elastically deformable retaining member are such that, at pressures in the lower part of the working range of the valve, the retaining member is held in an elastically deformed condition, and the valve plug and liner are maintained in forceful intimate contact independent of the valve body, and are such that at relatively higher pressures above some predetermined intermediate pressure, the retaining member is further elastically radially expanded by the forces from the development of line pressure between the upstream liner member and the valve plug, and the upstream liner member and the valve plug separate, reducing the force required to open the valve.

The rotary plug valve of the present invention retains the advantages of having both an upstream and a downstream seal at lower pressures. Two of the major advantages of maintaining both an upstream seal and a downstream seal at lower pressures are fluid-containing redundancy and the maintaining of a dry valve body cavity under normal operating conditions.

Fluid-containing redundancy is inherent in a valve having two seals. If the upstream seal fails and begins to leak, the downstream seal will prevent fluid from escaping.

As to maintaining a dry valve cavity, it often occurs in the use of the valve of the present invention that the normal operating pressure of the valve will be below the pressure at which the upstream seal is lost. This permits the valve cavity to remain dry under normal operating conditions, and provides the redundant fluid containment as explained above. It is desirable to keep the valve cavity dry to prevent the entrance of foreign matter between the valve components which may cause excess wear and poor valve operation.

When it is necessary, however, to operate the valve near the high end of its working range, as may be required when hydrostatically testing equipment, the upstream seal can break loose and permit easier valve operation at those high pressures. The "breakover" design, which permits the upstream liner member and the valve plug to separate at higher pressures above some predetermined intermediate pressure, effectively eliminates, or nearly eliminates, the clamping force between the valve plug and the upstream seal at those higher pressures so that the breakout torque or opening torque is very substantially reduced as compared with conventional valves. The downstream seal is, of course, retained, and while absolute fluid-containing redundancy is eliminated at high pressures in the valve of the present invention, a significant degree of actual fluid-containing redundancy is retained. Thus, if the downstream metal-to-metal seal or elastomeric O-ring seal should be damaged so as to permit some actual fluid leakage through the valve to the downstream discharge line, actual fluid flow is minimized and is throttled by the interposition in the path of fluid flow of the upstream seal, coupled with the extremely close-tolerance labyrinth effect of the matching parts (the two valve liner members, the valve plug and the internal wall of the valve body cavity) so that leakage remains minimal, and the velocity of fluid leaking through the valve is not increased to a dangerous level.

The retaining rings in the Bishop valve hereinbefore described serve an entirely different purpose than do the ones in the valve of this invention. Bishop's rings merely hold his casing and plug together at low pressures; at higher pressures where fluid would begin to leak between the casing and plug, the Bishop valve becomes inoperable due to that leakage. As is explained below, the rings in the valve of this invention are used to hold the liner and plug together inside a casing, and to permit the liner and plug to slightly separate at some predetermined line pressure.

In sum, the valve of the present invention incorporates the independent actions of two liner members held in intimate but non-clamping contact with the valve plug by means of elastic energizing bands. At lower pressures below some predetermined intermediate pressure, the valve has both an upstream seal and a downstream seal. This predetermined intermediate "breakover" pressure is dependent on the dimensions and material properties of the elastic energizing bands. At pressures above this intermediate "breakover" pressure, the high pressure fluid forces its way between the upstream liner member and the valve plug, thereby causing the upstream liner member and the valve plug to separate, and further elastically expanding the energizing bands. This relieves the force between the upstream liner member and the valve plug, thereby reducing the force required to open the valve.

It is, therefore, a general object of the present invention to provide an improved rotary plug valve.

A further object of the present invention is the provision of a rotary plug valve having a removable valve body liner which is of simple and economical construction.

Yet a further object of the present invention is the provision of rotary plug valve wherein the valve body liner is maintained in forceful intimate but non-clamping contact with the valve plug indepenedent of the valve body.

Another object of the present invention is the provision of a rotary plug valve wherein, at pressures in the lower part of the working range of the valve, there are maintained both an upstream seal and a downstream seal.

Yet another object of the present invention is the provision of a rotary plug valve wherein at higher pressures above some predetermined intermediate pressure, the upstream seal is relieved, thereby reducing the torque required to open the valve.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a side elevational view of the rotary plug valve of the present invention taken partially in cross-section.

FIG. 2 is a side elevational view similar to FIG. 1, but showing additional parts in cross-section.

FIG. 3 is a sectional view taken along line 3—3 of FIG. 1.

FIG. 4 is a graph showing calculated and actual breakout torques required to open the rotary plug valve of the present invention over a wide pressure range as compared to a prior similar valve.

DETAILED DESCRIPTION OF PREFERRED EMBODIMENTS OF THE INVENTION

Referring now to the drawings, and particularly to FIGS. 1 and 2, the improved rotary plug valve of the present invention is illustrated and generally designated by the numeral 10. The valve 10 basically comprises a valve body 12 having an inlet fluid passageway 14 and an outlet fluid passageway 16 disposed therein. As illustrated in FIGS. 1 and 2, the ends of the valve body 12 within which the inlet and outlet fluid passageways 14 and 16 are disposed can include conventional threads, can be adapted for welding or can include other conventional pipe connecting means. A first cylindrical bore 20 is disposed in the valve body 12 positioned transversely and extending normal to the fluid passageways 14 and 16, and extending from the lower portion of the body to the interior of the valve body. A second cylindrical bore 18 of reduced diameter as compared with the first bore 20, and concentric with the first bore 20, is disposed in the valve body above the bore 20 and extends through the valve body to communicate with the first bore 20.

The lower interior end portion of the bore 20 is provided with conventional threads 22, and a cover 24 extending into the lower end portion of the bore 20 is threadedly engaged with the threads 22. The upper portion of the cover 24 is cylindrical in shape and fits snugly within the lower end portion of the bore 20. An annular groove 26 is provided in the cover 24 around the peripheral surface thereof adjacent the interior surfaces of the bore 20, and a conventional O-ring 28 is disposed within this groove to provide a seal between the cover and the interior surfaces of the bore 20. The cover 24 further includes a central bore 30 extending therethrough, and the lower interior portion of the cover is provided with a recess 32 having a plurality of flat sides for receiving a tool to facilitate the installation and removal of the cover.

A liner, generally designated by the numeral 34, is disposed within the bore 20. The liner 34 is comprised of a pair of identical complementary semicylindrical liner members 36 and 38, each of which includes a fluid passageway aligned and communicating with one of the fluid passageways 14 and 16 of the valve body 12. That is, the upstream liner member 36 includes an inlet fluid passageway 40 aligned with the inlet fluid passageway 14 of the valve body 12, and the downstream liner member 38 includes an outlet fluid passageway 42 aligned with the outlet passageway 16 of the valve body 12. The liner members 36 and 38 further include annular grooves 44 and 46, respectively, positioned in the outer peripheral surfaces thereof around the fluid passageways 40 and 42. Conventional O-ring type resilient seal means 48 and 50 are disposed in the grooves 44 and 46 to provide seals between the liner members 36 and 38 and valve body 12. The liner members 36 and 38 are a pair of split complementary liner members. That is, they are formed by splitting a cylindrical liner along its axis, thereby forming two identical semicylindrical liner members.

Each of the liner members 36 and 38 includes complementary, axially spaced semi-annular grooves disposed in the outer peripheral surfaces at the top and bottom ends thereof. That is, the liner member 36 includes semi-annular grooves 52 and 54, and the liner member 38 includes semi-annular grooves 56 and 58. As will be apparent, when the liner members 36 and 38 are fitted together as shown in the drawings, the semi-annular grooves 52 and 56 thereof form an interrupted annular groove at the bottom end of the cylindrical liner 34, and the semi-annular grooves 54 and 58 form an interrupted annular groove at the top end of the liner 34. A pair of spaced, radially elastically deformable retainer rings 60 and 62, which will be described further hereinbelow, are disposed in the top and bottom annular grooves of the liner 34, respectively. The retainer rings 60 and 62 are split rings, each having two ends. That is, each ring forms nearly a complete circle, very similar to a piston ring in an automobile engine. As an alternative embodiment, the retainer rings 60 and 62 could be constructed as continuous rings.

In referring to FIGS. 1 and 2, it will be noted that each of the grooves 52–58 has a depth which is greater than the thickness of each of the retainer rings 60 and 62 so that the outer cylindrical surfaces of the liner members are positioned radially outwardly at all points from the radially outermost portion of each of the retainer rings.

As best shown in FIG. 2, the liner members 36 and 38 include longitudinally and radially extending slots 64 and 66, respectively, at the respective top ends thereof. A pair of pins 68 and 70 are attached to the valve body 12 and positioned to slidably project into the slots 64 and 66 of the liner members 36 and 38. The coaction of pins 68 and 70 with the slots 64 and 66 prevents the liner 34 from rotating with respect to the valve body 12, but allows longitudinal and transverse movement therebetween. That is, the liner 34 can be withdrawn longitudinally from the valve body 12 by way of the bore 20 when the cover 24 is removed therefrom, and the liner 34 and the valve plug 72 are free to move a small distance relative to each other, and/or to move a small distance relative to the valve body 12 in a direction parallel to the fluid passageways 14 and 16.

Referring specifically to FIG. 2, a valve plug, generally designated by the numeral 72, is disposed with the liner 34 in the valve body 12. The valve plug 72 includes an enlarged cylindrical portion 74 positioned within the liner 34, and defines a flow passageway 76 positioned for alignment with the fluid passageways 40 and 42 of the liner members 36 and 38 upon rotation of the valve plug. The valve plug 72 further includes opposite longitudinally extending reduced diameter cylindrical portions 78 and 86 which are journaled within the bore 18 of the valve body 12 and the bore 30 of the cover 24. That is, an upper cylindrical portion 78 which extends through the bore 18 of the valve body 12 to the exterior thereof. The upper end of the cylindrical portion 78 which extends outside the valve body 12 is provided with a plurality of flat surfaces 80 for receiving a handle or other operator for rotating the valve plug 72 between open and closed positions. An annular groove 82 is disposed in the interior surface of the bore 18, and a conventional annular resilient seal means 84 is disposed within the groove 82 to provide a seal between the interior surface of the bore 18 and the exterior surface of the cylindrical portion 78 of the valve plug 72. The lower cylindrical portion 86 of the plug 72 extends into the bore 30 on the cover 24. An annular groove 88 is disposed within the bore 30, and a conventional annular resilient seal means 90 is disposed within the groove 88 to provide a seal between the interior surface of the bore 30 and the exterior surface of the lower cylindrical portion 86 of the plug 72.

The dimensions of the enlarged cylindrical central portion 74 of the valve plug 72, the liner members 36 and 38 and the retaining rings 60 and 62 are such that when the valve plug 72 is fitted within the assembled liner 34 and the retaining rings 60 and 62 positioned in the annular grooves disposed around the top and bottom ends of the liner, the retainer rings 60 and 62 are elastically defomed whereby the valve plug 72 and liner 34 are maintained in forceful intimate contact, and a positive seal is provided between the valve plug and the liner. That is, the retainer rings 60 and 62 are formed in a manner similar to automobile engine piston rings, whereby they can be expanded radially and fitted over and within the annular grooves of the liner 34 in and elastically deformed condition. The outside diameter of the enlarged portion 74 of the valve plug 72 closely corresponds with the inside diameter of the liner assembly 34 so that intimate contact between the outside peripheral surface of the valve plug with the inside surface of the liner 34 results.

In manufacturing the rotary plug valve 10 of the present invention, the top end portion of the valve body 12 is first machined into a cylindrical hub 94, and a horizontal keyway 96 is formed therein. The cylindrical hub 94 and keyway 96 are utilized to rigidly hold the valve body 12, and to facilitate the forming of the bore 18 and the bore 20, and the location and installation of the pins 68 and 70 attached to the valve body 12. In addition, the hub 94 and keyway 96 are utilized for the simple and convenient attachment of a conventional hydraulic, pneumatic or electric valve operator to the valve body 12 if desired. The liner 34 is conveniently machined as a single workpiece to the desired shape and dimensions, and is then split longitudinally to form the complementary liner members 36 and 38.

In operation of the rotary plug valve 10, fluid under pressure enters the valve body 12 by way of the inlet passageway 14, and when the valve plug 72 is in the open position, flows through the fluid passageway 40 disposed in the liner member 36, the flow passageway 76 of the valve plug 72, the fluid passageway 42 in the liner member 38, and the outlet fluid passageway 16 in the body 12. The dimensions of the valve plug 72, the liner members 36 and 38, and the retaining members 60 and 62 are such that when the valve 10 is in the closed position as shown in FIG. 2, at pressures in the lower part of the working range of the valve, the retaining members are held in an elastically deformed condition, and the valve plug and liner are maintained in forceful contact independent of the valve body. The pressurized fluid is therefore prevented from flowing through the valve 10 by upstream seals formed between the enlarged portion 74 of the valve plug 72 and the internal surface of the liner member 36 adjacent the fluid passageway 40, and between the outer surface of liner member 36 and the bore 20, adjacent the fluid passageways 14 and 40. In addition, downstream seals are formed between the enlarged portion 74 of the valve plug 72 and the internal surface of the liner member 38 adjacent the fluid passageway 42 and between the outer surface of the liner member 38 and the bore 20, adjacent the fluid passageways 42 and 16.

At higher pressures above some predetermined intermediate pressure, line pressure develops between the upstream liner member 36 and the valve plug 72. In other words, the high-pressure fluid in the fluid passageway 40 forces its way between the enlarged portion 74 of the valve plug 72 and the internal surface of the liner member 36 adjacent the fluid passageway 40, causing the enlarged portion 74 of the valve plug 72 and the liner member 36 to separate, and causing the retaining members to elastically radially expand. The inset of the retaining members relative to the outer peripheral surface of the liner members prevents them from interfering with the described separation due to contact of the retaining members with the internal wall of the valve body at this time. I have determined from testing that approximately 0.0005 inch is an appropriate clearance for high-pressure fluid to bleed between the liner member and the valve plug without entraining harmful solids. The intermediate pressure at which this "breakover" occurs is dependent upon the dimensions and material properties of the retaining rings 60 and 62. This "breakover" or destroying of the seal between the liner member 36 and the enlarged portion 74 of the valve plug 72 effectively eliminates the direct force previously exerted on the valve plug by the liner member 36 and the frictional contact between these elements, so that the torque required to rotate the valve plug 72 to open the valve 10 is reduced. The downstream seals between the enlarged portion 74 of the valve plug 72 and the internal surface of the liner member 38 adjacent the fluid passageway 42, and between the outer surface of the liner member 38 and the bore 20 adjacent the fluid passageways 42 and 16, are maintained at all pressures.

This design allows the valve 10 to maintain upstream and downstream seals at lower pressures, and to "breakover" above some intermediate pressure to the condition in which the upstream seal is released in order to reduce the torque required to open the valve at those higher pressures. For example, referring to FIG. 4, a graph is depicted showing the calculated and actual breakout torques required over a pressure range of 10,000 psig for the rotary plug valve of the present invention and for a prior valve of the rotary plug type. Line 100 on the graph represents breakout torque information published in the literature for the prior valve. Line 102 represents the actual breakout torque required to open the prior valve over the same pressure range as determined in the laboratory. Line 104 represents the calculated breakout torque required to open the rotary plug valve of the present invention using conventional engineering techniques, and line 106 represents the actual breakout torque required to open the rotary plug valve of the present invention as determined in the laboratory.

From FIG. 4, it can be seen that the breakout torque required to open the rotary plug valve of the present invention is generally less than that required to open the prior art valve tested, and that at a fluid pressure of approximately 4,000 psig, the "breakover" occurred whereby the high-pressure fluid in the fluid passageway 40 forced its way between the enlarged prortion 74 of the valve plug 72 and the internal surface of the liner member 36 adjacent the fluid passageway 40, causing the valve plug and the liner member 36 to separate, thereby reducing the force exerted by the liner member 36 on the valve plug, and reducing the torque required to open the valve 10.

Thus, the rotary plug valve of the present invention is well adapted to carry out the objects and attain the ends and advantages mentioned as well as those inherent therein. While presently preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. A rotary plug valve comprising:
  a valve body defining a generally cylindrical bore and having inlet and outlet fluid passageways disposed therein on opposite sides of said bore, said bore being positioned transversely to said fluid passageways;
  a pair of split, semi-cylindrical complementary liner members, including an upstream liner member and a downstream liner member, together forming a generally cylindrical liner positioned in said bore, said liner having inlet and outlet fluid passageways in said valve body, and said liner including a pair of longitudinally spaced annular grooves extending in substantially parallel planes and spaced along said cylindrical bore from each other;
  a pair of radially elastically deformable, spaced retaining members disposed in tension around said liner and positioned in said annular grooves, said grooves having a depth at least equal to the thickness of the respective retaining member positioned therein whereby the outer cylindrical peripheral surface of said generally cylindrical liner is positioned radially outwardly at all points thereon from the radially outermost portion of each of said radially elastically deformable, spaced retaining members, and said retaining members are spaced radially inwardly from the valve body at a time when the outer cylindrical peripheral surface of said generally cylindrical liner is in contact with said valve body;
  a cylindrical valve plug rotatably positioned within said generally cylindrical liner, and defining a flow passageway therein positioned for alignment and registry with said liner fluid passageways upon rotation, the dimensions of said valve plug, said liner members forming said liner and said retaining members being such that at pressures in the lower part of the working range of said valve, said retaining members are held in an elastically deformed condition and said valve plug and liner are maintained in forceful contact with each other independent of said valve body, and such that at relatively higher pressures above a predetermined intermediate pressure, said retaining members are elastically expanded by the force from the development of line pressure between said upstream liner member and said valve plug, and said upstream liner member and said valve plug separate, reducing the force required to open said valve; and
  seal means interposed between said liner and said valve body about the peripheries of said fluid passageways in said liner.

2. The valve of claim 1 wherein said retaining members are split rings each having two ends.

3. The valve of claim 1 wherein:
  said valve body has disposed therein a second cylindrical bore coaxially aligned with said first cylindrical bore and having a lesser diameter than said first cylindrical bore;
  and wherein said valve body includes an end having a cylindrical hub around said second cylindrical bore, and said hub having a keyway disposed therein in the outer surface of said valve body, and projecting from said bore along said hub for attachment to the hub of a valve operator;
  said valve plug including an enlarged cylindrical portion rotatably positioned within said liner and a cylindrical portion of reduced diameter extending through said second cylindrical bore in said valve body.

4. The valve of claim 3 further comprising:
  removable cover means closing said first cylindrical bore in said valve body; and
  means for fixing said liner against rotation relative to said valve body, but permitting longitudinal and transverse movement therebetween, connected to said valve body and cooperating with said liner.

5. The valve of claim 4 further comprising:
  resilient seal means interposed between said reduced diameter cylindrical portion of said valve plug and said second bore in said valve body.

6. The valve of claim 5 wherein said retaining members are split rings each having two ends.

7. The valve of claim 5 wherein said means for fixing said liner against rotation relative to said valve body, but permitting longitudinal and transverse movement therebetween, comprises:

said liner including at least one longitudinally extending slot positioned in an end thereof abutting said valve body; and longitudinally positioned pin means attached to said valve body slidably projecting into said slot.

8. The valve of claim 7 wherein said removable cover means includes a central bore disposed therethrough, and said valve plug includes a second cylindrical portion of reduced diameter extending into said central bore in said cover means;

and wherein said valve is further characterized as including resilient seal means interposed between said second cylindrical portion of said valve plug and said bore in said cover means.

* * * * *